UNITED STATES PATENT OFFICE.

WALTER O. SNELLING, OF ALLENTOWN, PENNSYLVANIA.

VULCANIZED-OIL PRODUCT.

1,376,174.   Specification of Letters Patent.   Patented Apr. 26, 1921.

No Drawing. Original application filed May 22, 1915, Serial No. 29,765. Divided and this application filed August 21, 1919. Serial No. 318,967.

*To all whom it may concern:*

Be it known that I, WALTER O. SNELLING, a citizen of the United States, residing at Allentown, in the county of Lehigh and State of Pennsylvania, have invented certain Improvements in Vulcanized-Oil Products, (being a division of application S. N. 29,765, filed May 22, 1915,) of which the following is a specification.

The general object of my invention is the preparation of cohesive and plastic masses possessing certain of the general properties of rubber, and capable of being used in part as a substitute thereof, and in part as compounding ingredients, capable when mixed with other substances such as resins, rubber, gutta percha, and like materials, of yielding products having advantageous properties which by vulcanization or other appropriate treatment may be still further modified and changed to yield products having desirable properties of cohesiveness, toughness, elasticity and plasticity.

In my application above referred to, of which this is a division, I have disclosed methods of producing rubber-like products by vulcanizing a vegetable oil under conditions which permit of the later transformation of the original vulcanized product into a tough, cohesive and plastic product, and I have also disclosed a method by which related vulcanized oil products of fluid nature and unique properties may be prepared.

In my said application I disclosed, but did not specifically claim, certain modifications of my general method of preparing plastic vulcanized oil products, and the object of my present application is to cover a modified process of preparing plastic vulcanized oils, and the products obtained through the use of such process.

It has long been known that when a fatty oil is admixed with a small amount of sulfur chlorid, a reaction occurs with the production of a body very different in nature from the original oil. The reaction is generally recognized to be very similar to the reaction which occurs when rubber is brought in contact with sulfur chlorid, and the product obtained is generally known as "factis".

I have discovered that hydroxylated organic bodies are able to bring about deep-seated changes in the nature of factis, so that under suitable conditions the factis can be transformed into a plastic mass having many of the properties of unvulcanized rubber. While I do not know the exact nature of the internal changes which occur, the action of the hydroxylated organic body brings about the depolymerization of the factis, with an increase in the attraction exerted by the smaller molecular aggregates upon other like molecular aggregates, with consequent development of plasticity.

There are a large number of hydroxylated organic bodies which are capable of acting upon factis to give plastic products. As examples of suitable hydroxylated bodies I may mention methyl alcohol, ethyl alcohol, amyl alcohol, hydroxystearic acid, and many like bodies having a hydroxyl group. Examples of vulcanizable oils suitable for the production of factis to be rendered plastic in accordance with my invention are soya bean oil, cotton-seed oil, linseed oil, and many other fatty oils. The vulcanizable oils may be sulfurized by means of sulfur chlorid, or other vulcanizing agent may be employed if desired, fatty oils vulcanized at an elevated temperature by means of sulfur also giving plastic products when treated according to my invention.

According to my present invention I first make factis by vulcanizing a fatty oil, and I then depolymerize the vulcanized oil product so prepared by the use of a hydroxylated organic body. Suitable factis may be made by mixing 16 c. c. of carbon bisulfid and 67 c. c. of cotton-seed oil, and after stirring these materials together adding to the mixture 17 c. c. of sulfur chlorid. Heating soon begins from chemical reactions within the mixture, and as soon as the heating seems to reach a maximum with some evidence of frothing, the liquid is poured out on a smooth surface in a film about 1 m. m. in thickness. Preferably stirring is continued during the entire period of reaction, and up to the moment that the liquid is poured out upon the cold surface. After about two to three hours the film thus prepared is stripped from the surface on which it has solidified. It is now ready for depolymerization, but preferably it is crushed or ground and exposed to the air for a period of several days before treatment.

The factis prepared as above is placed in a small vessel and a suitable amount of a depolymerizing agent is added. The depolymerizing agent should be thoroughly admixed with the factis, and preferably after mixing the vessel containing the factis and the depolymerizing agent should be closed and left for about one-half hour, to enable the depolymerizing agent to be absorbed by the factis. Sulfur chlorid is then added to the contents of the vessel, the factis being preferably stirred during the addition of the sulfur chlorid. The vessel should now be closed and left for four hours, at the end of which time the contents of the vessel should be depolymerized to liquid condition. This liquid represents highly depolymerized material, and should now be repolymerized to a solid of suitable plasticity, preferably by agitation with water. In my preferred form of procedure I pour the contents of the vessel into water, and agitate thoroughly with a beater. The liquid changes to a light colored flocculent product, which may be formed into a plastic but tough sheet by working it between rollers.

The depolymerized and repolymerized product made in accordance with my present invention has many valuable properties of toughness and flexibility, and may be employed in the preparation of floor tiles, belting, and many other purposes for which rubber and leather are now commonly used. By suitably modifying the time that the material remains in the liquid state before the repolymerization is brought about, the color and other physical characteristics of the material may be modified to a considerable extent. A long period of standing in depolymerized condition tending to give dark colored products on repolymerization, while a shorter period of standing in depolymerized condition gives light colored repolymerized products. The toughness of the repolymerized product may be modified by the use of a greater or less quantity of the depolymerizing agent, and the plasticity of the repolymerized product may be increased by a shortening of the time between the pouring of the liquid depolymerized product into water and the sheeting of the repolymerized product, while a lengthening of the time elapsing between the agitation of the liquid depolymerized product with water and the sheeting operation leads to a great decrease in plasticity, or even to the formation of very tough but wholly non-plastic products.

From the foregoing statement it will be evident that the range of modifications which may be effected in my process is very great. My invention should therefore not be considered as being limited to the specific illustrations given, but should be understood to cover all equivalents of the materials and methods that have been specifically mentioned, and no limitations are to be imposed upon my invention except such as are indicated in the appended claim.

I claim as my invention:

A liquid vulcanized oil product capable of being transformed into a solid factis-like material on contact with water.

In testimony whereof, I have hereunto subscribed my name this 20th day of August, 1919.

WALTER O. SNELLING.